(12) United States Patent
German et al.

(10) Patent No.: US 7,748,411 B2
(45) Date of Patent: Jul. 6, 2010

(54) INSERTABLE PIGGABLE PLUG SYSTEM

(75) Inventors: Mikhail German, Johnston, RI (US);
Leo W. Fleury, North Smithfield, RI (US)

(73) Assignee: Mueller International, Inc.,
Portsmouth, NH (US)

( * ) Notice: Subject to any disclaimer, the term of this patent is extended or adjusted under 35 U.S.C. 154(b) by 981 days.

(21) Appl. No.: 11/497,637

(22) Filed: Aug. 2, 2006

(65) Prior Publication Data
US 2007/0028982 A1 Feb. 8, 2007

Related U.S. Application Data

(60) Provisional application No. 60/705,364, filed on Aug. 4, 2005.

(51) Int. Cl.
*F16L 55/10* (2006.01)
(52) U.S. Cl. .................. 138/89; 138/97; 137/317
(58) Field of Classification Search .............. 138/89, 138/97; 137/317, 318
See application file for complete search history.

(56) References Cited

U.S. PATENT DOCUMENTS 3,032,867 A * 5/1962 Kerr .................... 29/213.1

4,463,597 A * 8/1984 Pierce et al. .............. 73/40.5 R
6,691,733 B1 * 2/2004 Morris ....................... 137/317
2005/0241711 A1 * 11/2005 Sayers et al. .................. 138/89

OTHER PUBLICATIONS

T.D. Williamson, Inc., "Lock-O-Ring Flanges & Plugs," Bulletin No. 1120.001.01, Oct. 2002, pp. 1-6.

* cited by examiner

*Primary Examiner*—Patrick F Brinson
(74) *Attorney, Agent, or Firm*—Alston & Bird, LLP

(57) ABSTRACT

The present invention is a plug system having a plug for insertion into a pipeline, wherein the plug system is insertable via a fitting attached to the pipeline. A pre-drilled aperture of the pipeline positioned normal to the cylindrically-shaped pipeline may interfere with a pig traveling through the pipeline. In one embodiment, the plug includes two coaxial cylindrical portions. A first cylindrical portion has a diameter greater than the aperture diameter, while the second cylindrical portion has a diameter less than the aperture diameter. Additionally the plug defines a hole that is oriented perpendicular to an axis of the cylindrical portions, wherein the diameter of the hole is approximately the size of inside diameter of the pipe. The plug has a retaining member to stabilize the plug system. When the plug is installed in the pipe it permit a pig to flow freely, thereby eliminating pigging hazards.

8 Claims, 20 Drawing Sheets

US 7,748,411 B2

INSERTABLE PIGGABLE PLUG SYSTEM

CROSS-REFERENCE TO RELATED APPLICATIONS

This application claims benefit, under 35 U.S.C. §119(e), of U.S. Provisional Application Ser. No. 60/705,364, filed 4 Aug. 2005, the entire contents and substance of which are hereby incorporated by reference.

FIELD OF THE INVENTION

The present invention relates to pipeline fittings and, more particularly, to an installable, insertable fitting plug system adapted to permit a pipeline pig to freely pass by the fitting and eliminate pigging hazards.

BACKGROUND OF THE INVENTION

The Pipeline Safety Improvement Act of 2002 regulates management of gas transmission pipelines integrity. The Act, codified in 49 C.F.R. Part 192, significantly increased the complexity and cost of operating pipelines. Some stated objectives of the gas integrity management include improving pipeline safety through accelerating the integrity assessment of pipelines in high consequence areas; improving the government's role in reviewing adequacy of integrity programs and plans; and proving increased public assurance in pipeline safety. These regulations altered the integrity characteristics of new pipelines, and demanded the repair of many existing pipelines.

When repairing pipelines, it is often necessary to inhibit flow of product in the pipeline, and isolate pressure by inserting a stopping plug into the pipeline from, for example, a hot-taped fitting. Various types of the conventional plugs or pipeline stoppers exist and are widely used. When the repair work is finished, the stopper is removed and a completion plug is installed, sealing the fitting.

Some fittings, used for stopping flow, require the drilling of a hole through one pipe wall, while others require drilling through opposing walls. These openings, especially those with large diameters, might create a problem with running a pig through the pipeline. A pig is a device inserted into a pipeline that is designed to travel freely through it, driven by product flow to perform a specific task within the pipeline, e.g., remove wall debris, assess wall thickness, and/or assess wall deformation. Oftentimes, with conventional fittings in a pipeline, a pig can not pass through the fitting and may become lodged. To avoid potentially damaging the pig, or clogging the pipe with a lodged pig, the pig must be removed from the pipeline at a location short of the fitting, and then reinserted into the pipeline at a downstream position. This approach results in a significant loss of time and a potential loss of substantial profits, which are normally derived from use of the pipeline.

One existing solution to these problems is a type of a completion plug exemplified by T. D. Williamson Inc.'s Lock-O-Ring plug. This plug utilizes the original coupon of the pipeline cut to form the opening. The coupon is welded to a completion plug and, by being installed in a fitting, attempts to smooth the inside walls of the pipeline and therefore enable the pig to travel through the fitting.

There are some limitations with to this type of plug. One limitation includes the inability to use it with threaded completion plugs, because orienting the coupon inside the aperture during the installation process is not possible. Another limitation includes the inability to use the Williamson plug with pipes that have or will have holes in diametrically opposed walls.

Thus, there is a need in the art for a plug, insertable into a pipeline from a fitting that enables pigs to flow freely through the fitting, while eliminating pigging hazards. It is to such a device that the present invention is primarily directed.

SUMMARY OF THE INVENTION

A pipeline can transfer product, e.g., gas or liquid, from a first position to a second position. In transferring gas or liquid, waste occasionally builds up inside the pipe, typically along walls of the pipe. Additionally, a pipe wall may begin to deteriorate depending on the type of environment the pipe resides and/or the product the pipe carries.

As a result, a pig is commonly inserted into the pipe to clean the walls of the pipe or assess characteristics, i.e., wall thickness and/or deformation of the pipe. The pig is driven by the product flowing inside the pipe.

Pipes commonly have apertures along the length of the pipe. These apertures are created for access into the pipe for different purposes. Unfortunately, as a result of these apertures, pigs can fall off the center line of the pipe, or the path of the pig. As a result, the pig can become lodged in a fitting. Additionally, sensors attached to the pig may be damaged or even destroyed by sharp edges of the apertures. A lodged or damaged pig can result in significant time loss in using the pipeline and/or a potential loss of profits derived from the pipeline.

Generally described, the present invention comprises a plug system enabling a pig to flow freely through a pipeline at locations of pipeline apertures.

In an exemplary embodiment of the present invention, a plug system is used to enable a pipeline pig to pass freely though sections of the pipeline having apertures, which would otherwise hinder the travel of the pig. In an exemplary embodiment, the plug system includes a plug having two coaxial cylindrical portions; a hole, oriented perpendicularly to the axis of the cylindrical portions; and means for connecting inserting and extracting tools as well as for the plug positioning on the pipe. The first cylindrical portion of the plug system is larger than the diameter of an aperture in the pipeline. The second cylindrical portion of the plug system is smaller than the diameter of the aperture in the pipeline. The axis of the two cylindrical portions is positioned parallel to the axis of aperture. The hole diameter is approximately equal to the pipe inside diameter. The plug can be adapted by a fitting enabling a pig to flow freely through the pipeline and past the apertures.

In an exemplary embodiment, the plug can include a plurality of slots. The slots secure product flow to available branches, connected to the bottom or side outlets of the fitting.

Further, the plug system can include a retaining member for stabilizing the plug within the pipe.

These and other objects, features, and advantages of the present invention will become more apparent upon reading the following specification in conjunction with the accompanying drawings.

DETAILED DESCRIPTION OF PREFERRED EMBODIMENTS

The present invention includes a plug system that is insertable into a pipeline from a fitting, through a pipeline wall aperture. Preferably, the pipeline has a straight longitudinal axis and circular cross-section. The pipeline can further have at least one aperture positioned normal to the flow of product in the pipeline. In a preferred embodiment, the pipeline is adapted to receive a pig.

A plug of the plug system can include a body portion in communication with the circumferential outer surface of the pipe. Further, the plug can have a first cylindrical portion, or a large cylindrical portion, having a diameter that is greater than the diameter of the aperture. Additionally, the plug can have a second cylindrical portion, or a small cylindrical portion, having a diameter less than the aperture diameter. The plug of the plug system enables a pig to flow freely through the pipeline, and pass the aperture(s) without interference.

The materials described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Figure 1:
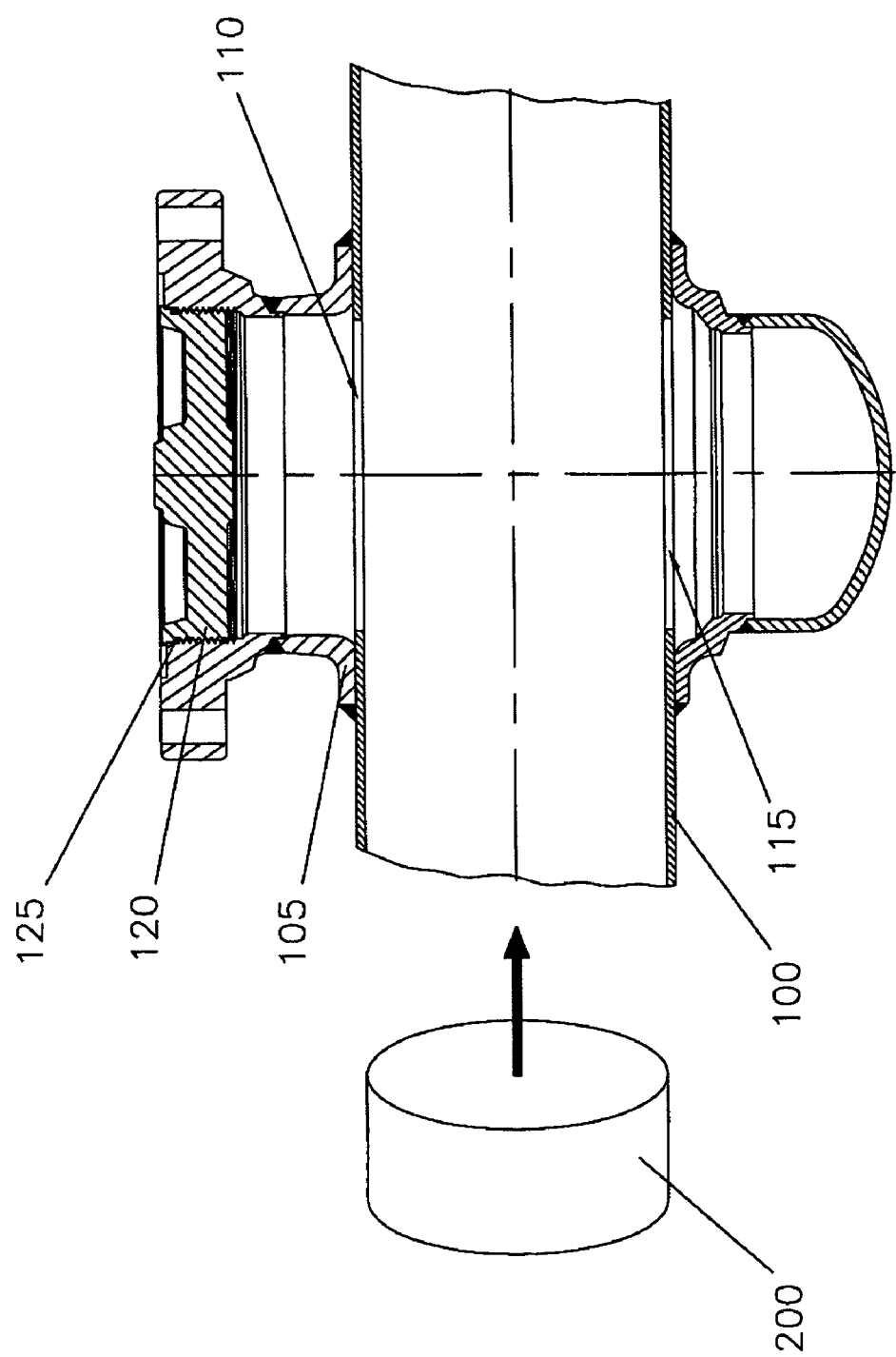
FIG. 1 is a vertical cross-sectional view illustrating a pipeline stopping fitting, shown in place on a pipe after a stopping procedure was completed.

Referring now to the figures, wherein like reference numerals represent like parts throughout the several views, FIG. 1 is a vertical cross-sectional view illustrating a pipeline stopping fitting, shown positioned on a pipe. A pipe or pipeline 100 preferably has a straight longitudinal axis and a circular cross section, wherein product or media, e.g., gas or liquid, normally can flow in the direction shown by the arrow.

If it is desired to stop such a flow of the product through the pipe 100 or through a particular section thereof, a plugger (not illustrated) can be employed from the stopping fitting 105 and be preliminarily installed on the pipe 100. The stopping fitting 105 can be attached to the pipe 100 using a conventional method such as mechanical joint, welding, and the like.

In order to have access into the pipe 100, or insert objects into the pipe 100, at least one aperture 110 in a wall of the pipeline 100 can be created. The axis of the aperture 110 is perpendicular to the product flow (as illustrated by the arrow in FIG. 1). In an exemplary embodiment, a second aperture 115 in a wall of the pipeline 100 can also be created. The aperture 110 enables the plugger (not illustrated) to be inserted into the pipe 100 from the fitting 105.

The apertures 110 and 115 can be formed by conventional well-known methods, including, for example, a circular cutter capable of removing the coupons from the pipe 100. One skilled in the art will recognize there are other methods of removing coupons from the pipe 100 to form apertures in pipelines that can be used. In an exemplary embodiment, the apertures 110 and 115 are preferably on diametrically opposing sides of the pipe 100.

The existence of the apertures 110 and 115 require that, after repair work is completed, a sealing member must be installed across the aperture; otherwise, product can leak from the pipe 100. In an exemplary embodiment, the completion plug 120 having a rubber O-ring 125 is installed in the stopping fitting 105 to restrict flow of product from the pipe 100.

A pig 200 can be inserted into the pipe. Then, the pig 200 can be fed through the pipe 100 via product flow to perform a number of functions, including, but not limited to: cleaning, displacement, batching, and internal pipe inspections. Unfortunately, the pig 200 can be damaged by sharp edges of the apertures 110 and 115, or can become trapped in/around the apertures 110 and 115.

Figure 2:
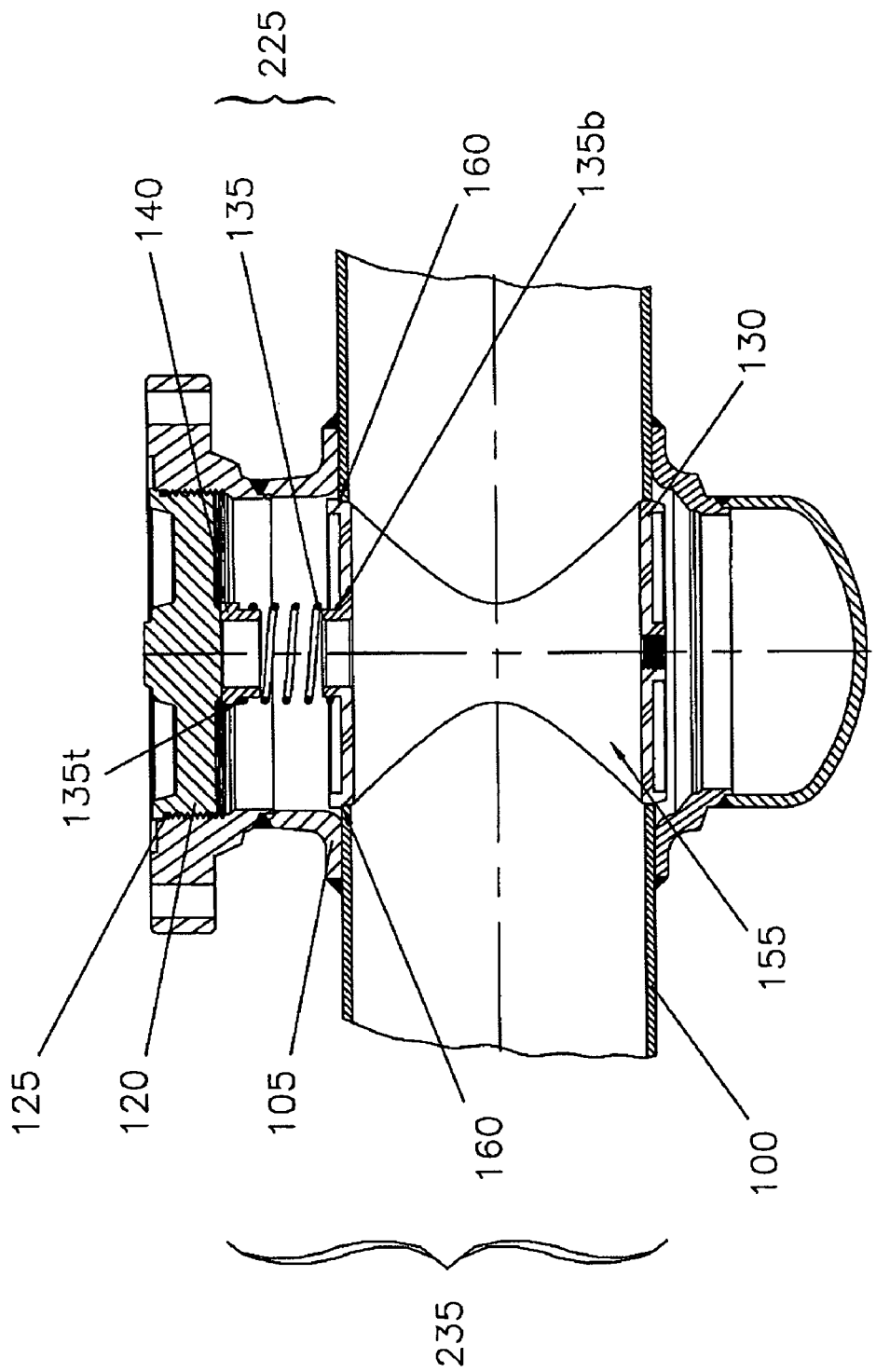
FIG. 2 is a vertical cross-sectional view illustrating the pipeline fitting with a plug system, in accordance with an embodiment of the present invention.
Figure 3:
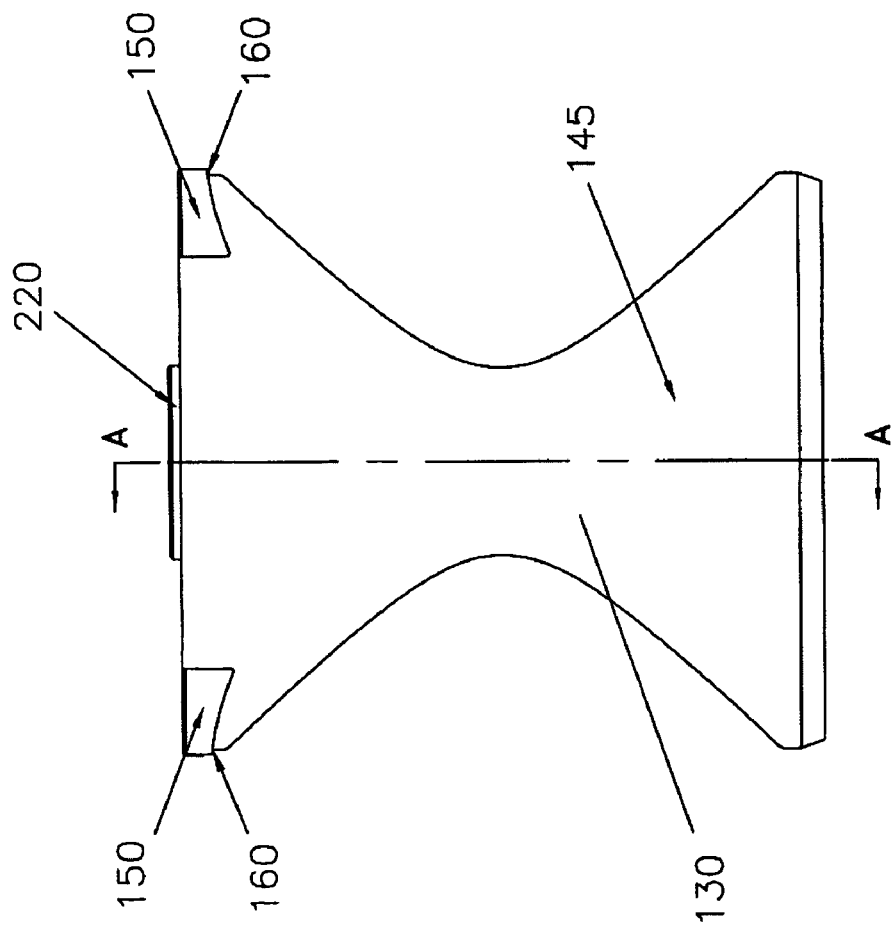
FIG. 3 illustrates a front view of the plug, in accordance with an embodiment of the present invention.

FIG. 2 is a cross-sectional view illustrating the pipe 100 having the pipeline fitting 105 with a piggable plug system 235 inserted in the pipeline 100, in accordance with an embodiment of the present invention. The plug system 235 includes the plug 130 and retaining assembly 225. Preferably, the plug system 235 can be inserted into the pipe 100 via the fitting 105 through the aperture 110. FIG. 2, however, illustrates the pipe having two apertures 110 and 115. Accordingly, the plug system 235 can block both apertures 110 and 115.

The retaining assembly 225 of the plug system 235 fits within the fitting 105. The retaining assembly 225 can include a spring 135, having a top 135t and a bottom 135b, and a bearing 140. The spring 135 can be compressed between the completion plug 120 at its top and plug 130 at its bottom to retain the plug 130 in place in the pipe 100.

Figure 15:
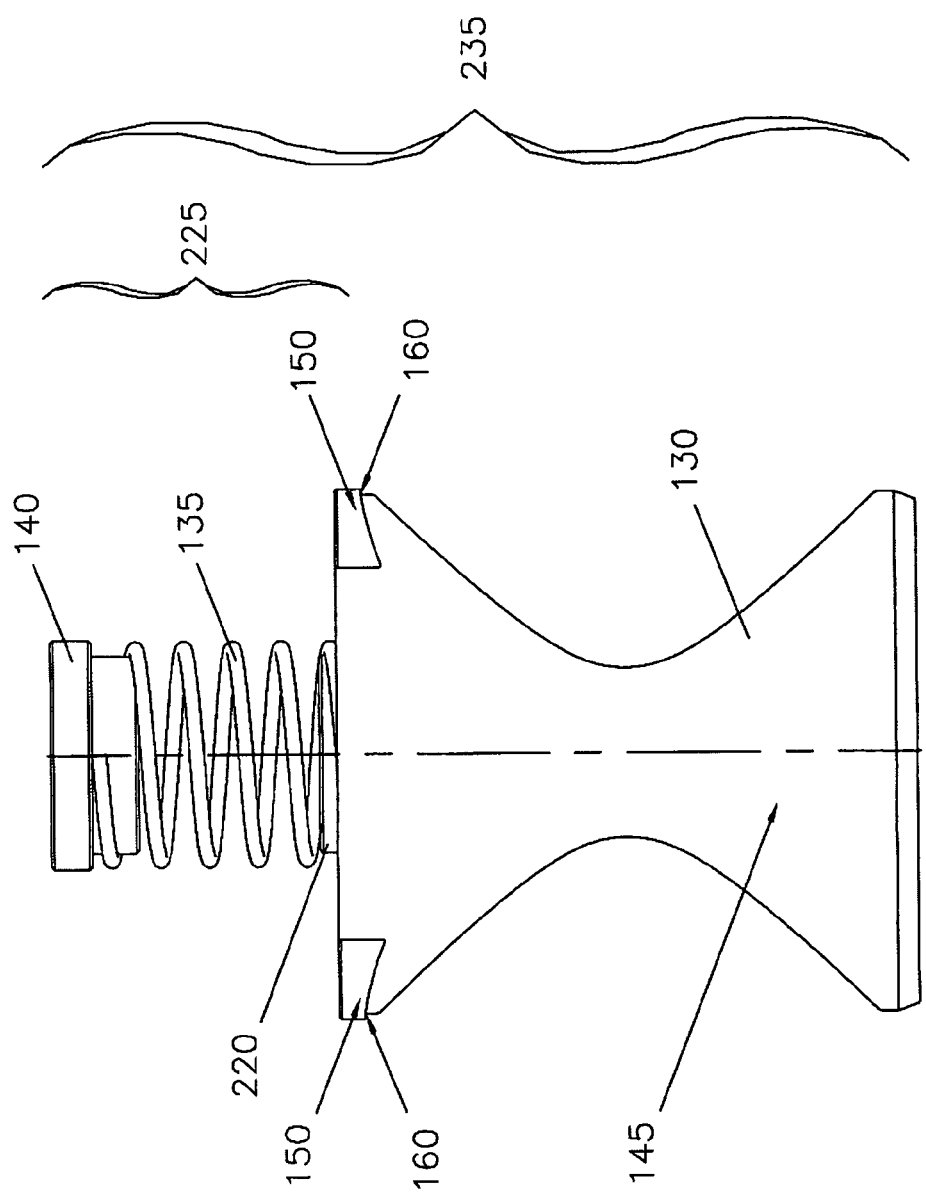
FIG. 15 illustrates a front view of the plug system, in accordance with an embodiment of the present invention.
Figure 16:
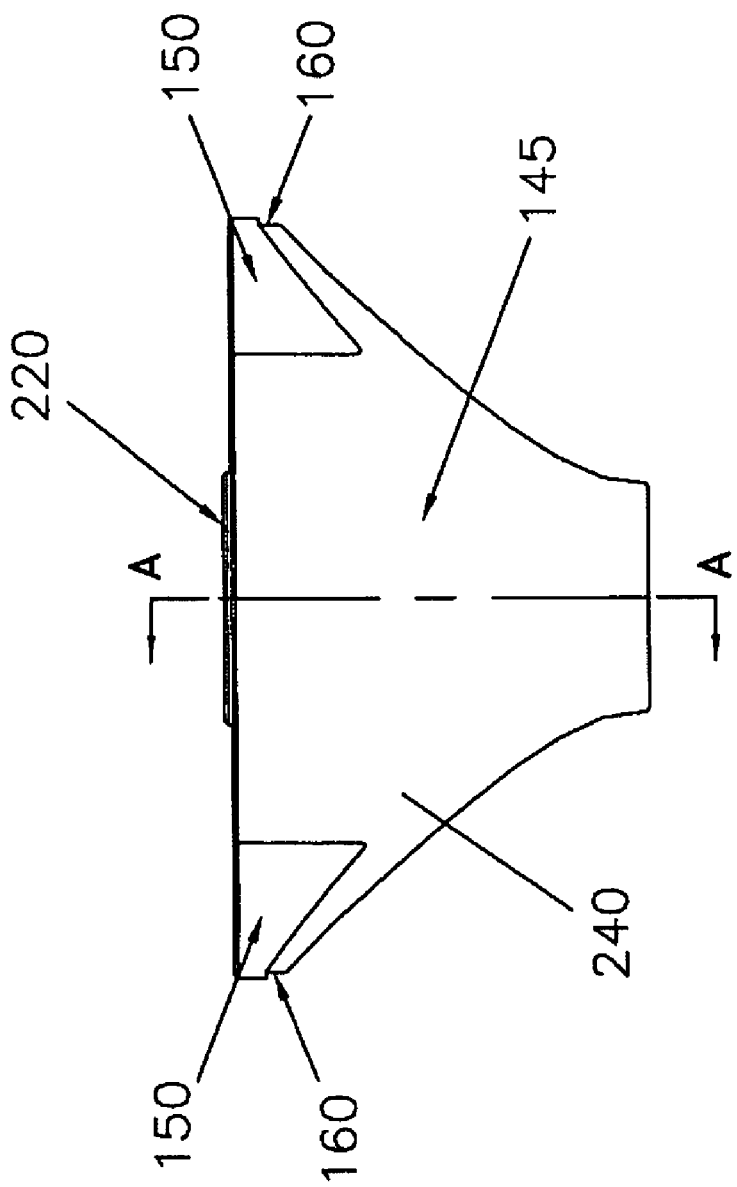
FIG. 16 illustrates a front view of the plug for the pipeline having one aperture, in accordance with an embodiment of the present invention.
Figure 17:
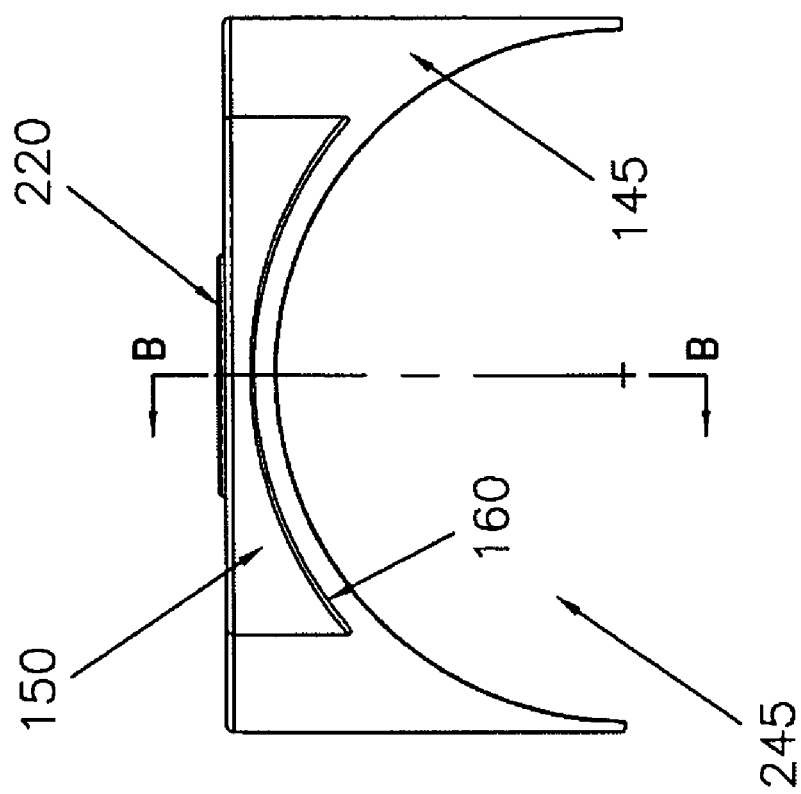
FIG. 17 illustrates a side view of the plug, for the pipeline having one aperture, in accordance with an embodiment of the present invention.
Figure 18:
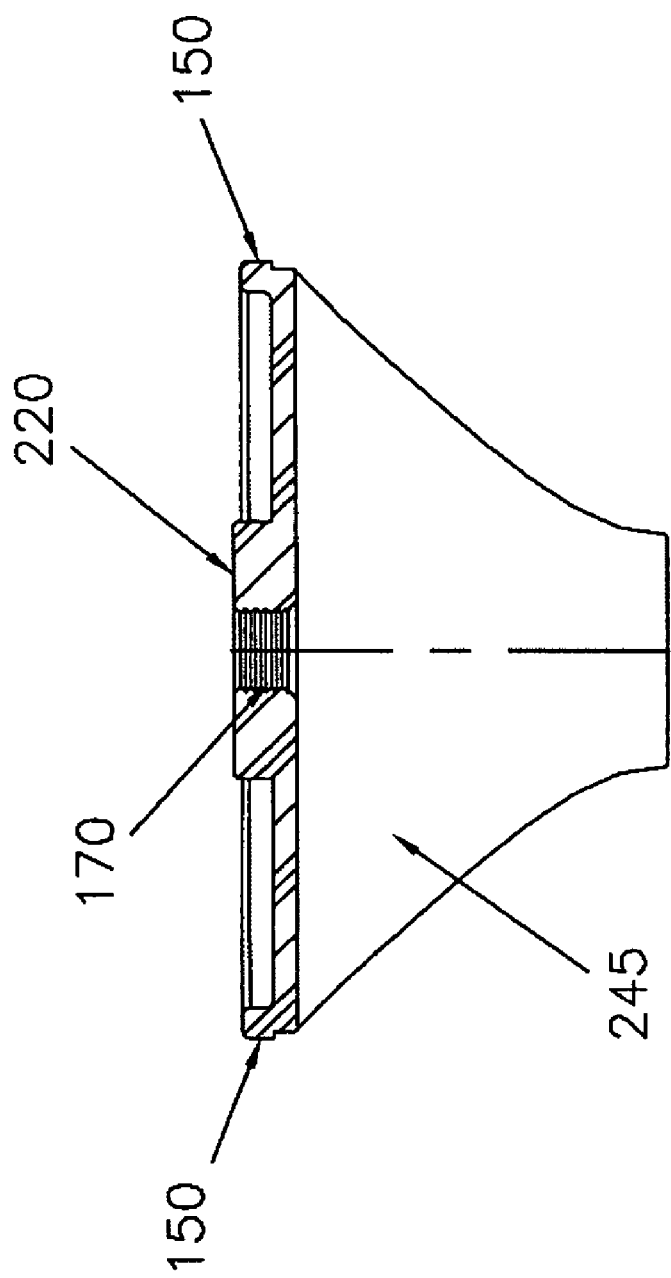
FIG. 18 is a sectional view taken from the line B-B in FIG. 17.
Figure 19:
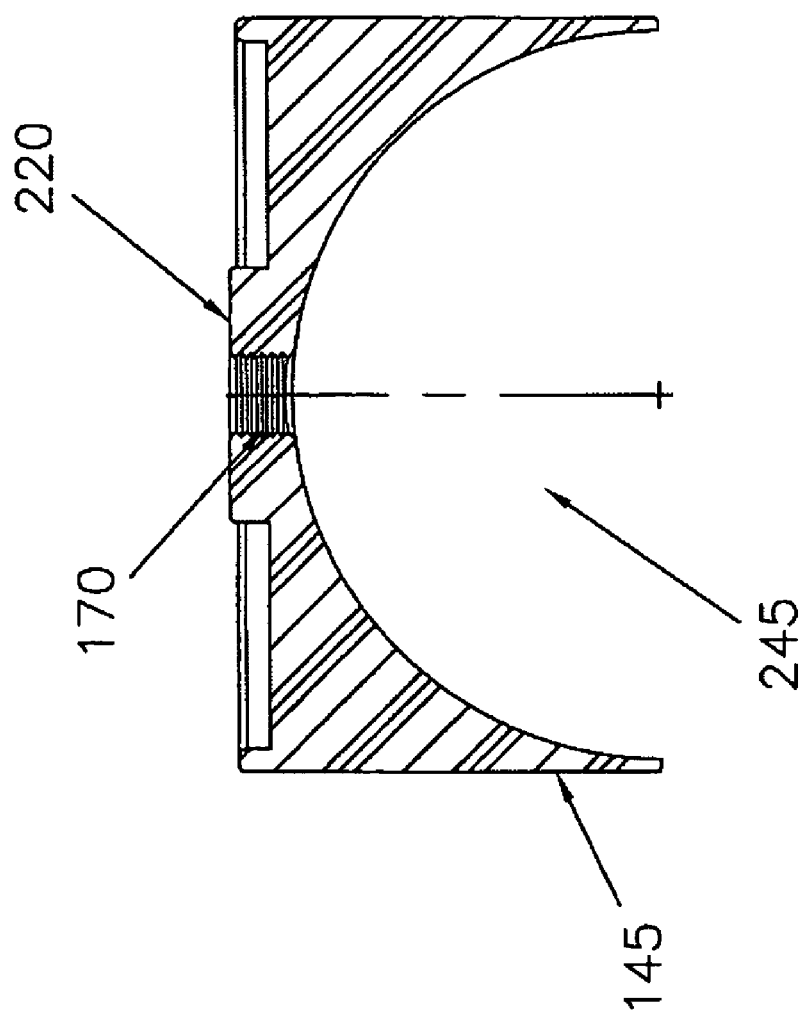
FIG. 19 is a sectional view taken from the line A-A in FIG. 16.

FIG. 15 is a close up illustration of the plug system 235, showing the retaining system 225 in communication with the plug 130. The plug 130 can have a round boss 220 at its top, which can be housed by the bottom 135b of the spring 135 for the spring positioning and retaining. The compressed spring 135 forces the plug 130 to remain stationary within the pipe 100. As a result, the spring 135 protects the plug 130 from axial displacement. The bearing 140 can be housed by the top 135t of the spring 135. The bearing 140 reduces friction between the completion plug 120 and the spring 135 during the completion plug installation in the fitting 105, thus protecting plug 130 from rotation.

Figure 4:
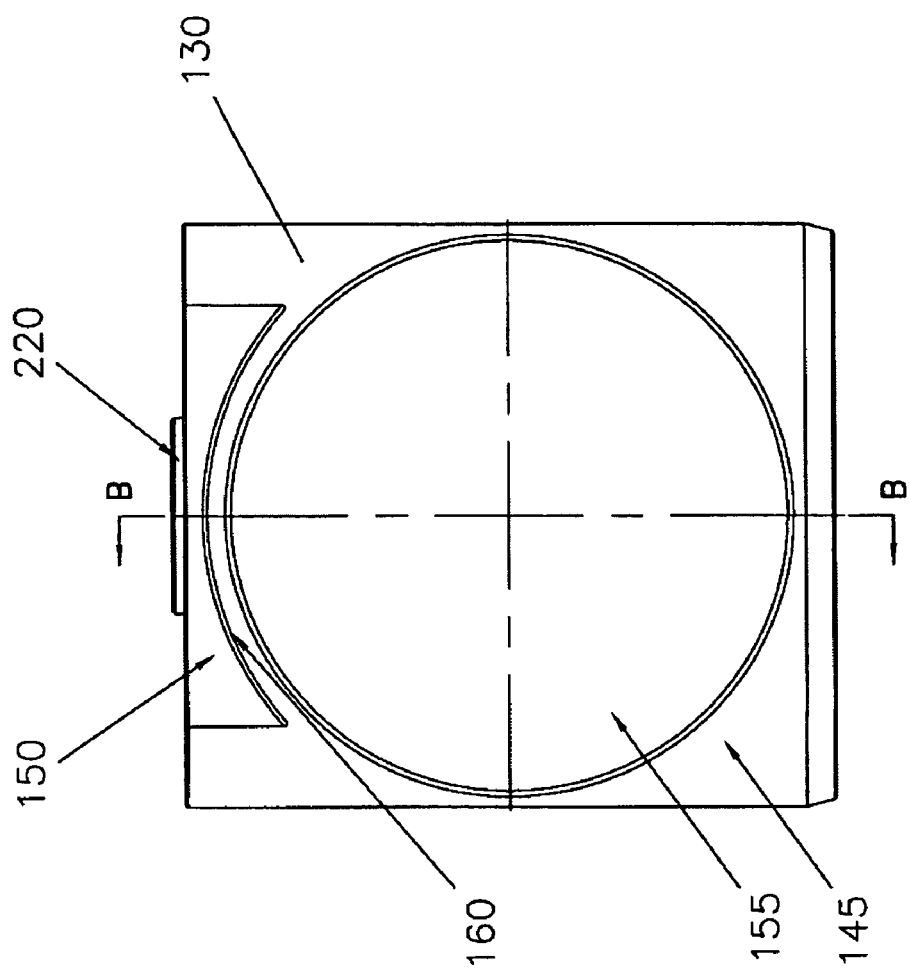
FIG. 4 illustrates a side view of the plug, in accordance with an embodiment of the present invention.
Figure 5:
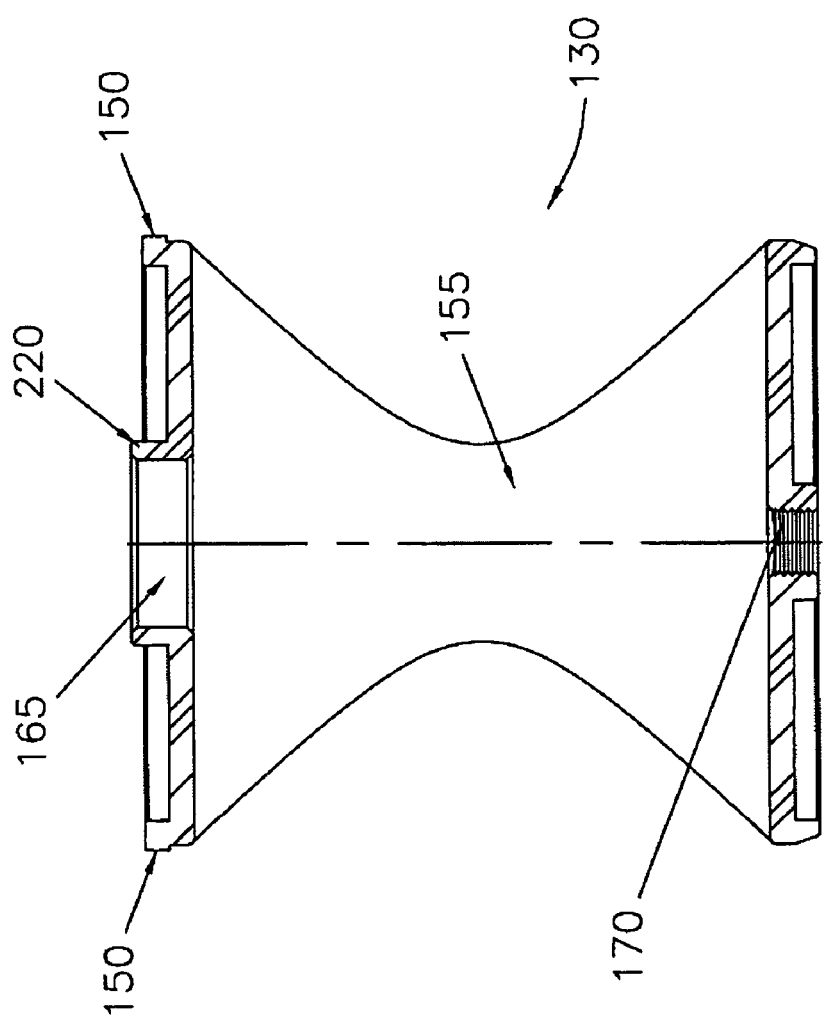
FIG. 5 is a sectional view of the plug, taken from the line B-B in FIG. 4.
Figure 6:
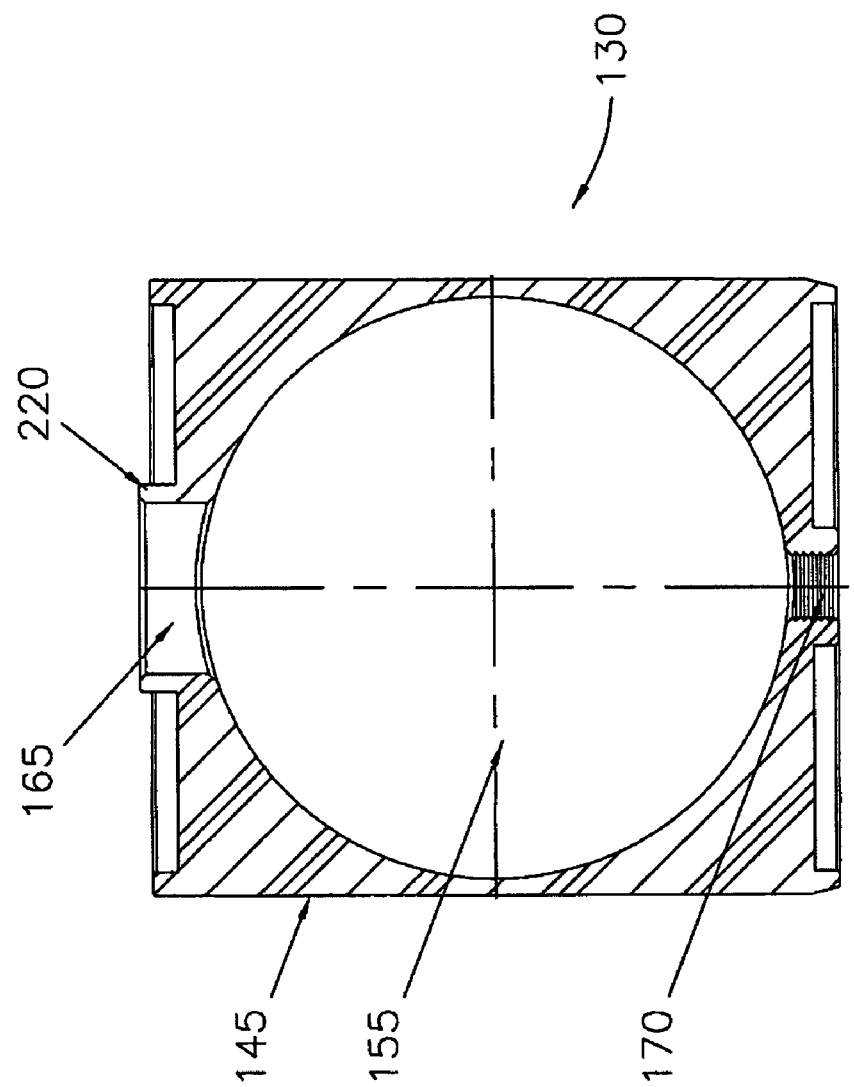
FIG. 6 is a sectional view of the plug, taken from the line A-A in FIG. 3.

In FIGS. 3-6, the plug 130 is illustrated in a close up view. The plug 130 can have a cylindrical portion 145 with the diameter slightly smaller than the diameters of the apertures 110 and 115. The plug 130 further includes two partial cylindrical portions 150 with the diameter being slightly larger than the diameter of the aperture 110, which, after plug 130 is inserted in the pipe 100, can be located above the aperture 110. The larger cylindrical portions 150 further can have arch-shaped undercuts 160 (see FIGS. 3 and 4), located 180 degrees apart, to aid in plug 130 orientation and stability during and after its insertion in the pipe 100. Further, the insertable plug 130 includes a circular opening 155, as illustrating FIG. 4, with a diameter approximately the size of the inner diameter of pipe 100. An axis of the opening 155 is approximately perpendicular to the axis of the cylindrical portions 145 and 150 of the plug 130. FIG. 4 also illustrates the location of the cylindrical portions 145 and 150, and arch-shaped undercuts 160, in relation to the opening 155. The arch-shaped undercuts 160 and the large cylindrical portions 150 can be positioned above the opening 155. A line connecting the centers of the arch-shaped undercuts 160 can be positioned parallel to the axis of the circular opening 155. After insertion of the plug system 235 in the pipeline 100 (see FIG. 2), the arch-shaped undercuts 160, interacting with the circumferential outer surface of the pipe 100, can coincide with the axis of the circular opening 155 and the longitudinal axis of the pipe 100. As a result, a pig can pass through the fitting 105 along with product flow. An opening 165 at the top of the plug 130 and a threaded hole 170 at its bottom, as shown in FIGS. 5-6, can be included to enable connection of the plug 130 insertion and extraction tools.

Figure 7:
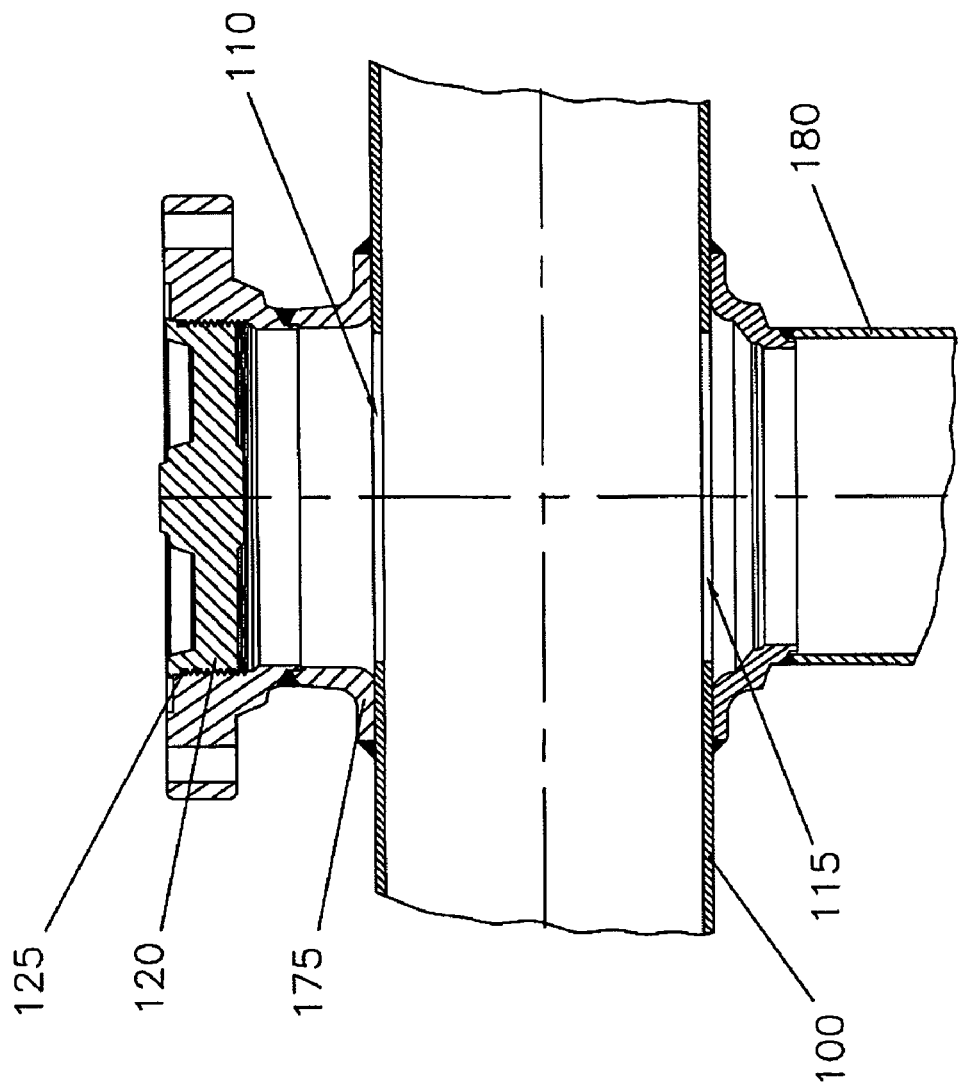
FIG. 7 is a vertical cross-sectional view illustrating the pipeline stopping fitting, shown in place on a pipe after a stopping procedure was completed, and further illustrating the pipeline having a fitting with a bottom outlet.

FIG. 7 illustrates a vertical cross-sectional view of the pipeline 100 with a fitting 175 having a bottom outlet and a branch 180 connected to this outlet. FIG. 7 is similar to FIG. 1, except a different type of fitting is shown, and the branch 180 is added to the bottom of the pipeline 100. The aperture 115, thus, opens to the branch 180.

Figure 8:
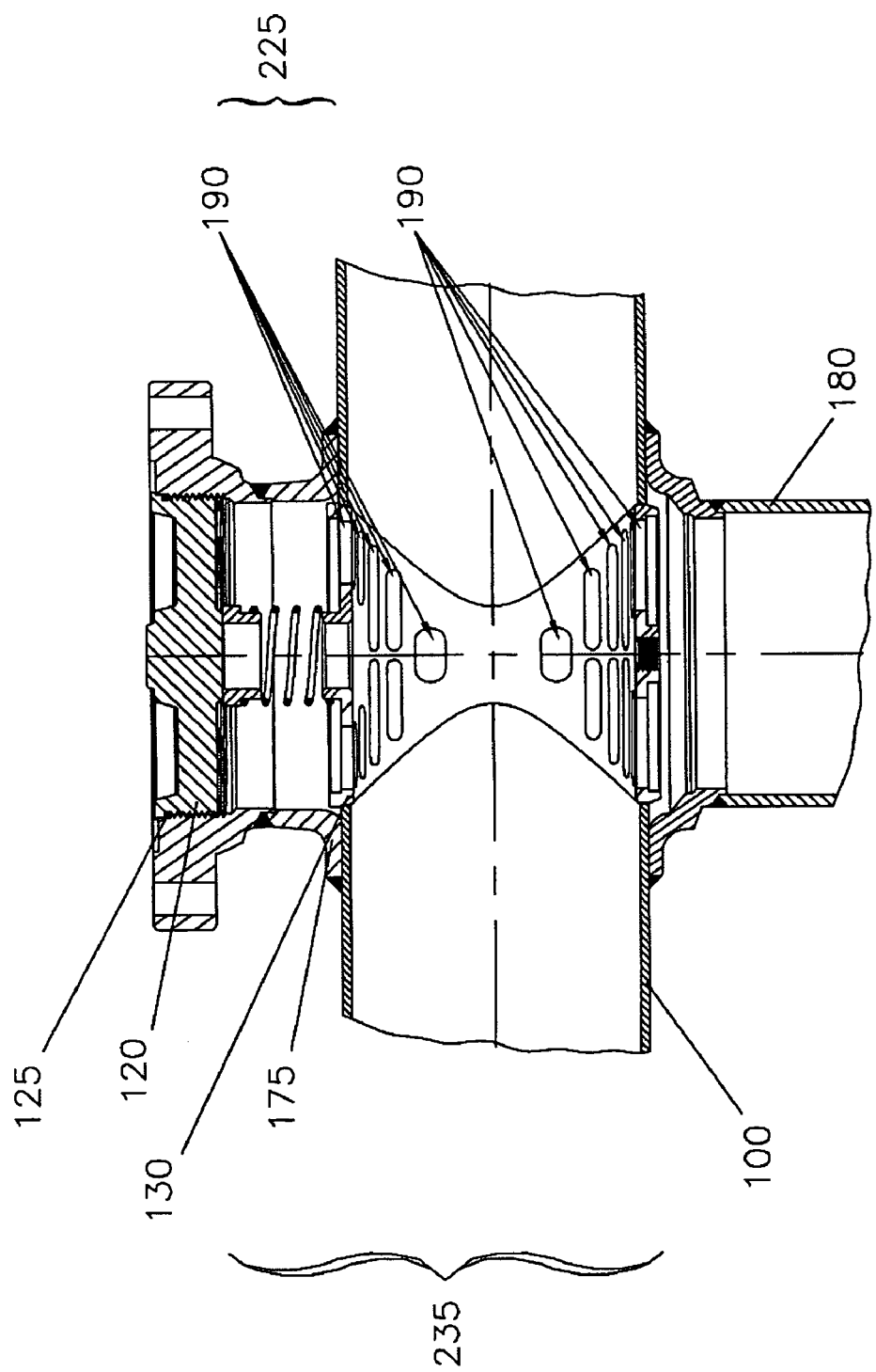
FIG. 8 is a vertical cross-sectional view illustrating the pipeline fitting with a plug system, further illustrating the pipeline stopping fitting having the bottom outlet housing an insertable plug with a plurality of slots, in accordance with an embodiment of the present invention.
Figure 9:
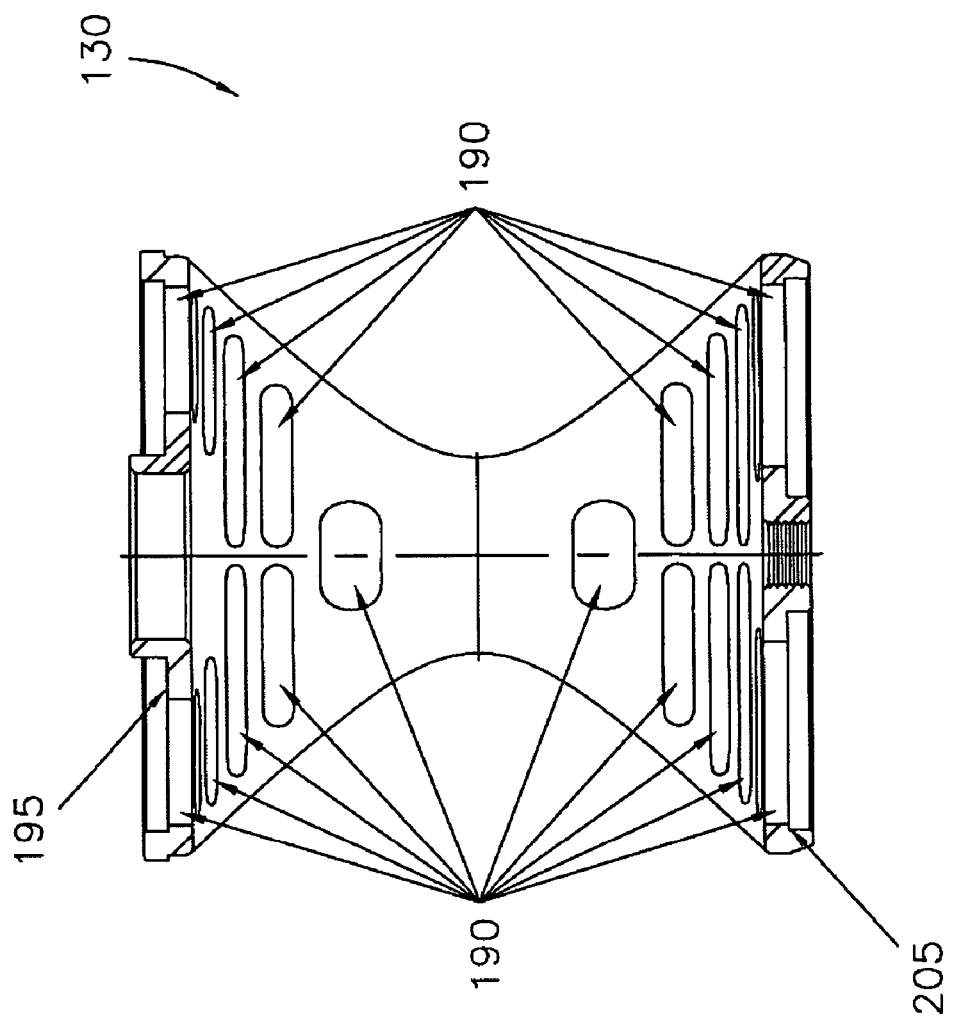
FIG. 9 is a sectional view taken from the line B-B in FIG. 4 illustrating the plug having slots, in accordance with an embodiment of the present invention.
Figure 10:
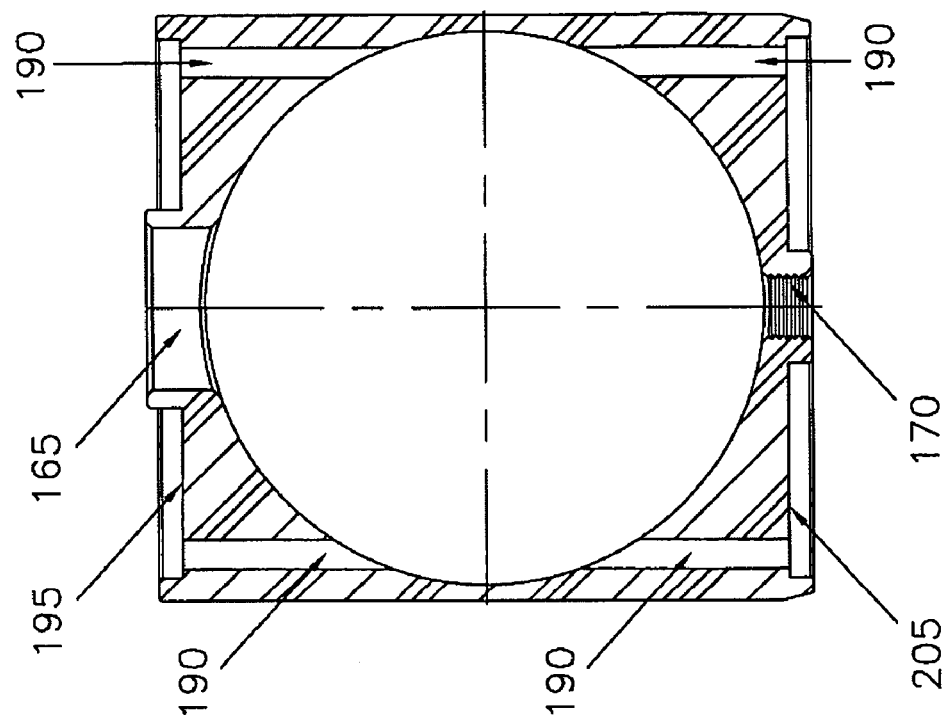
FIG. 10 is a sectional view taken from the line A-A in FIG. 3 illustrating the plug having slots, in accordance with an embodiment of the present invention.
Figure 11:
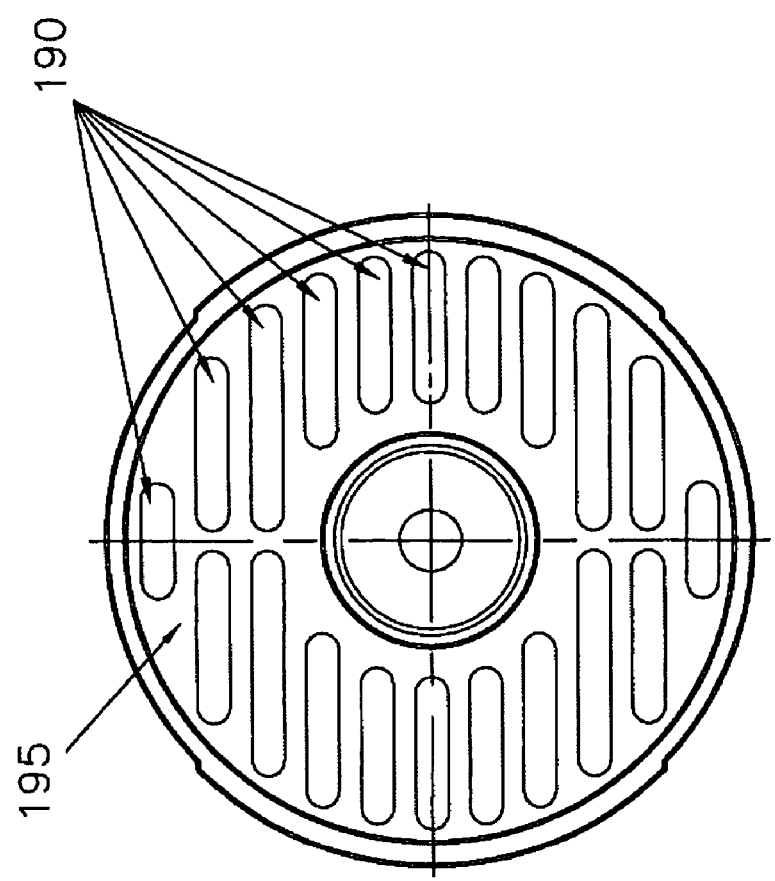
FIG. 11 illustrates a top view of the insertable plug with slots, in accordance with an embodiment of the present invention.
Figure 12:
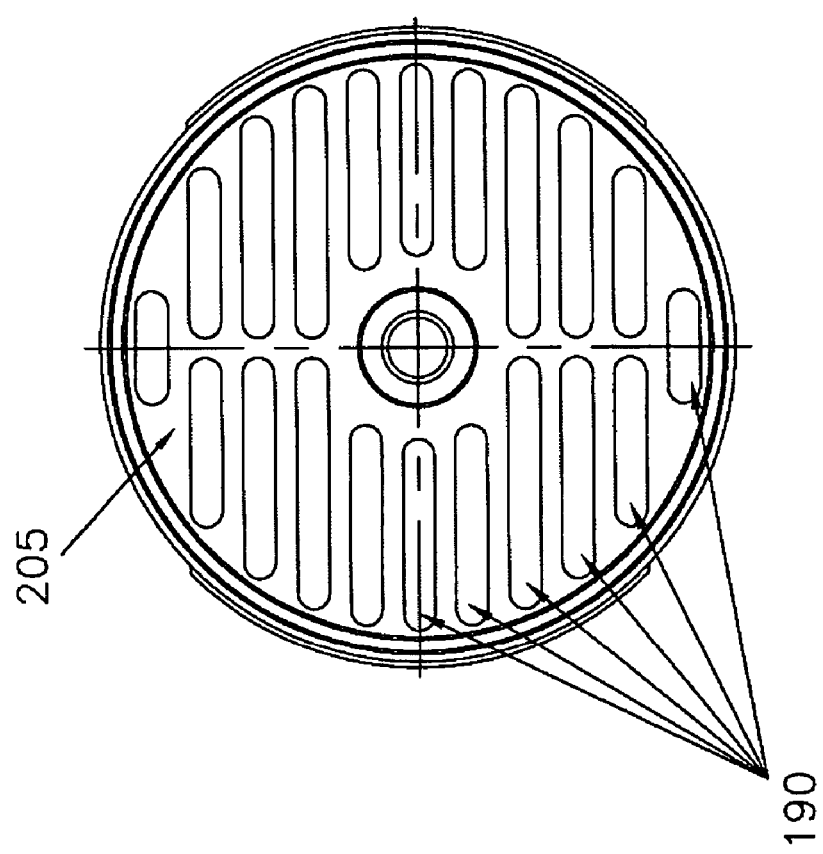
FIG. 12 illustrates a bottom view of the insertable plug with slots, in accordance with an embodiment of the present invention.

FIG. 8 depicts a vertical cross-sectional view illustrating the pipeline 100 having the bottom outlet fitting 175 installed and the plug system 235 inserted into the pipeline 100, in accordance with an embodiment of the present invention. As it shown in FIGS. 9-12, the plug 130 can include a plurality of slots 190, which can connect circular opening 165 to an external space surrounding the plug 130 through the top 195 and bottom 205 surfaces of the plug 130, thus allowing product to flow from the pipe 100 into the branch 180.

Figure 13:
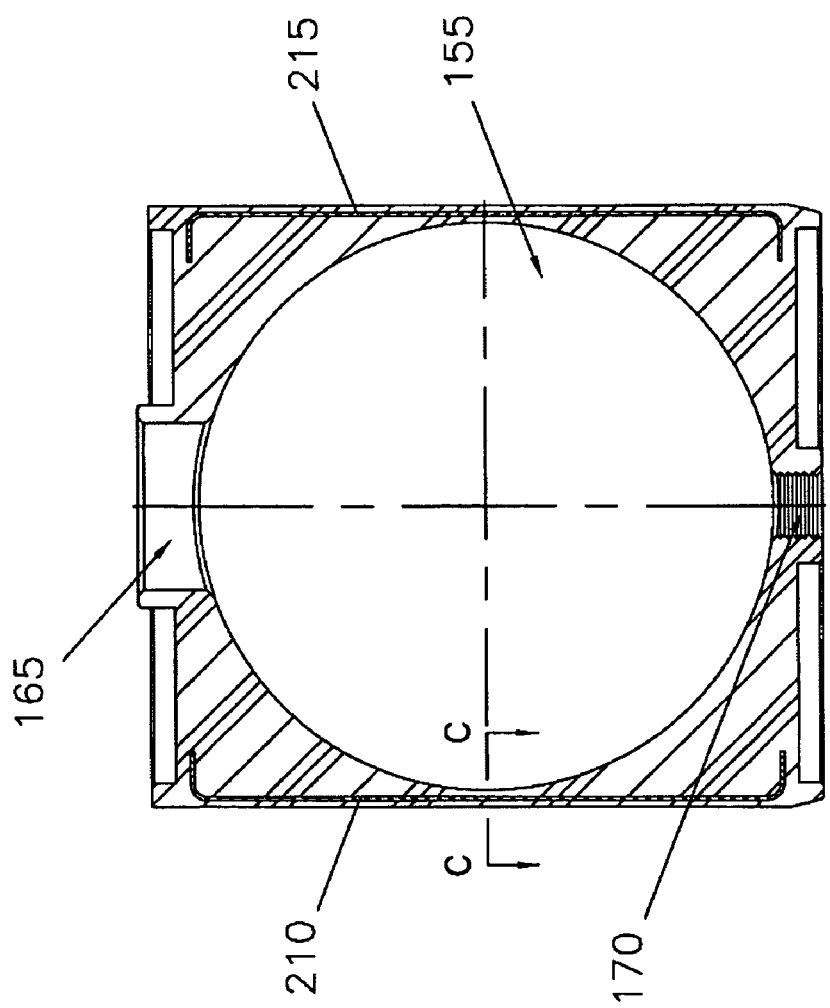
FIG. 13 is a sectional view of the plug, taken from the line A-A in FIG. 3 further illustrating the plug having reinforcing inserts, in accordance with an embodiment of the present invention.

The plug 130 of the plug system 235 can be fabricated from a wide range of materials such as metals, rubbers, plastics, etc. In an exemplary embodiment, the plug 130 can be fabricated from a material having low mechanical properties. Common law mechanical properties materials that can be used to fabricate the plug 130 include rubber, polyurethane, plastic, and the like. To increase integrity and rigidity of the plug 130 the reinforcing inserts can be placed inside its body. FIG. 13 illustrates a sectional view of the insertable plug 130 having the reinforcing inserts 210 and 215, taken from the line A-A in FIG. 3.

Figure 14:
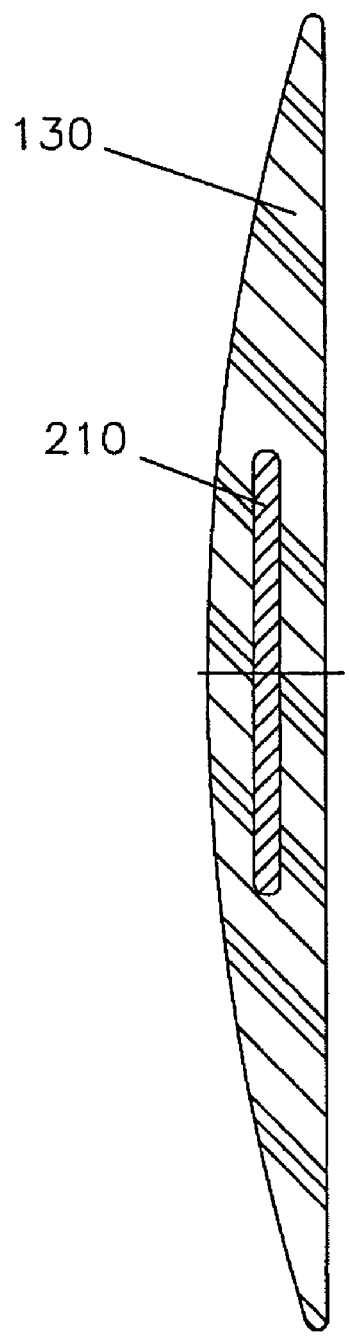
FIG. 14 is a close up of a sectional view taken from the line C-C in FIG. 13.

FIG. 14 is a close-up of a sectional view from the line C-C in FIG. 13, illustrating the reinforcing insert 210 inside the plug 130. In a preferred embodiment, the inserts 210 and 215 can be positioned perpendicularly to an axis of the opening 155 approximately in its middle reinforcing the plug at its weakest section. One skilled in the art would appreciate that the reinforcing inserts 210 and 215 can be positioned at other locations to aid in reinforcing the plug 130. One skilled in the art would also appreciate that the material used for the reinforcing insert 210 or 215 can be of the material including reinforcing characteristics for the plug 130.

Figure 20:
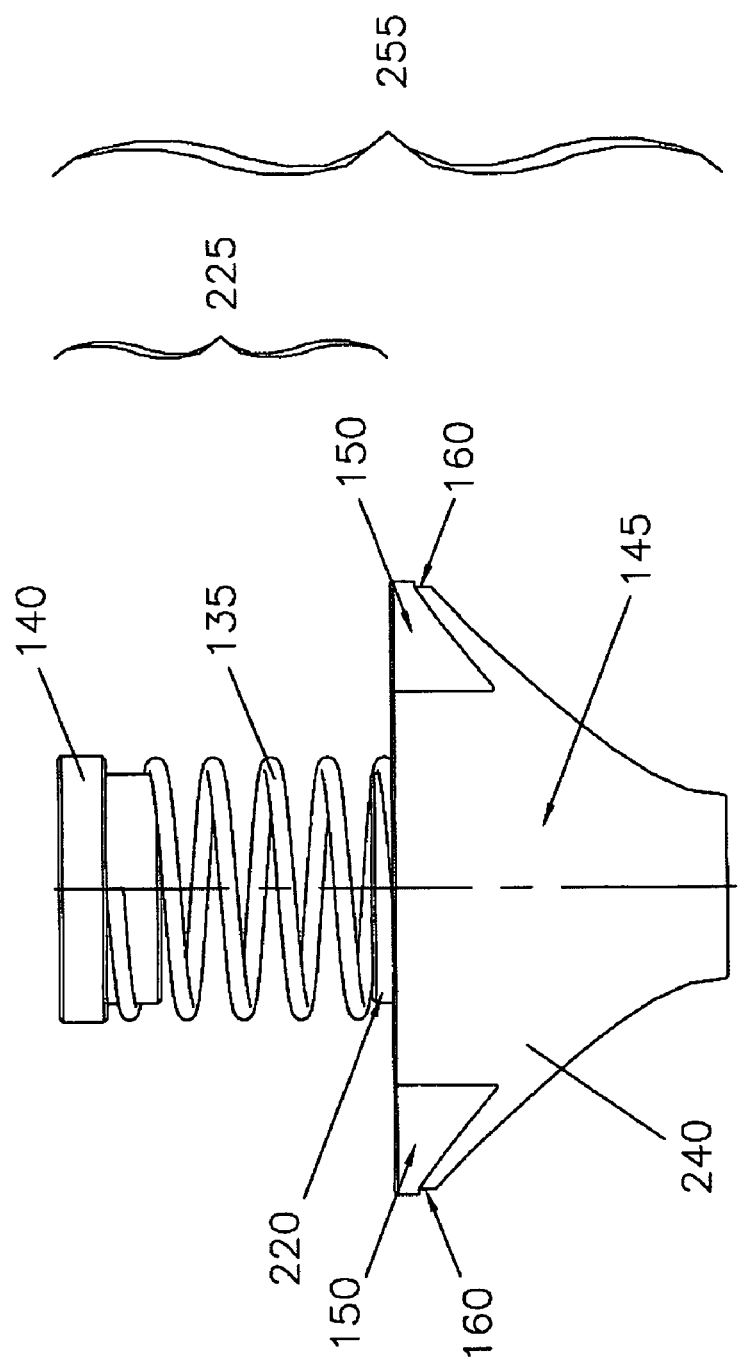
FIG. 20 illustrates a front view of the plug for the pipeline having one aperture, in accordance with an embodiment of the present invention.

Referring now to FIG. 20, a plug system 255 is illustrated for the pipeline 100 having only one aperture 110. The plug system 255 includes a plug 240 and a retaining assembly 225.

FIGS. 16-19 relate to FIGS. 3-6 illustrating the plug 240 of a plug system 255, wherein the pipeline 100 includes only one aperture 110, in accordance with an embodiment of the present invention. Like the plug 130 of the plug system 235, intended for an insertion in the pipeline having the top 110 and bottom 115 apertures (See FIGS. 2-6), the plug 240 of the plug system 255 can include cylindrical portions 150 with the diameter greater than the diameter of the aperture 110. Further, like the plug 130, the plug 240 can include the cylindrical portion 145 with the diameter slightly less than the diameter of the aperture 110, the arch-shaped undercuts 160, and the threaded hole 170 for connection of the plug 240 insertion and retracting tools. The plug 240, however, can include the half-cylindrical opening 245 instead of the full cylindrical opening 155 in the plug 130. While the plug 130 preferably covers the whole inside circumferential surface of the pipe 100 in an area around the apertures 110 and 115, the plug 240 need only cover inside surface of the pipe 100, preferably above the pipe centerline. Moreover, because of these differences in the shapes of the plugs 130 and 240, the threaded hole 170 for connection of the plug 240 insertion and retracting tools can be located at the top of the plug 240, more particularly, inside the round boss 220.

The assembly of both plug systems 235 and 255, intended for the insertion in the pipe 100 with one or two apertures can have the same insertion process. The plug 130 or 240 can be assembled with the spring 135 and the bearing 140 outside the fitting 105. The completion plug 120 with the O-ring 125 can be removed from the fitting 105 (the machines and procedures used for the completion plug removal and re-installation, as well as for the plug system insertion are not discussed in this invention). After this, the plug system 235 can be connected to the insertion tool and inserted into the pipe 100. Before insertion, the plug system 235 must be oriented relatively the pipe 100 to ensure that the axis of the opening 155 or 245 is parallel to the longitudinal axis of the pipe 100.

In summary, the pig 200 placed into the pipe 100 would conventionally catch a corner of the aperture 110 or 115 and cause the pig 200 to clog product flow, and/or damage the pig 200. The plug systems 235 and 255 enable the pig 200 inserted into the pipeline 100 to flow freely through the fitting 105, past the apertures 110 and 115, and eliminate pigging hazards.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A pipe plug system for insertion into a pipe from a fitting attached to the pipe, wherein the pipe has at least one aperture defined in the wall of the pipe, the pipe plug system having a plug comprising:

a first plug cylindrical portion for positioning and stabilizing the pipe plug system on the pipe, the first cylindrical portion having a diameter greater than a diameter of the aperture in the pipe;

a second plug cylindrical portion having a diameter less than the diameter of the aperture in the pipe; and wherein the plug defines a hole that is oriented perpendicular to an axis of the plug cylindrical portions and having a diameter approximate the diameter of the pipe inside diameter.

2. The pipe plug system of claim 1, wherein the pipe plug system enables a pipe pig to flow through the hole in the plug.

3. The pipe plug system of claim 1, further including a retaining member, wherein the retaining member is positioned between the plug and a fitting completion plug, wherein forcing the plug to be tightly connected to an outer surface of the pipe to reduce axial displacement of the plug.

4. The pipe plug system of claim 3, wherein the retaining member is a spring mechanism.

5. The pipe plug system of claim 4, wherein the retaining member has a bearing at its top end to reduce friction between the completion plug and retaining member during system installation, and to protect the plug from rotation.

6. The pipe plug system of claim 1, wherein the first cylindrical portion has at least two undercuts positioned approximately 180 degrees apart, interacting with the pipe outer surface and enabling the plug to be oriented within the pipe.

7. The pipe plug system of claim 1, wherein the plug includes a plurality of slots connecting an opening of the plug to an external space surrounding the plug and enabling media to flow freely to the external space.

8. The pipe plug system of claim 1, wherein the plug has a reinforcing element, wherein increasing plug integrity and rigidity.

* * * * *